United States Patent
Bhardwaj et al.

(10) Patent No.: US 7,725,613 B2
(45) Date of Patent: May 25, 2010

(54) DEVICE INSTALLATION WITH HOST CONTROLLER CONSIDERATION

(75) Inventors: Vatsal Bhardwaj, Seattle, WA (US);
Joby S. Lafky, Seattle, WA (US);
Sanford L. Spinrad, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 164 days.

(21) Appl. No.: 11/276,397

(22) Filed: Feb. 27, 2006

(65) Prior Publication Data

US 2007/0239903 A1 Oct. 11, 2007

(51) Int. Cl.
*G06F 3/00* (2006.01)
*G06F 9/00* (2006.01)

(52) U.S. Cl. ............... 710/8; 710/10; 710/104; 713/1; 717/174; 719/327

(58) Field of Classification Search ......... 710/8, 710/10, 104; 713/1; 717/174; 719/327
See application file for complete search history.

(56) References Cited

U.S. PATENT DOCUMENTS

| | | | | |
|---|---|---|---|---|
| 4,956,863 A * | 9/1990 | Goss | ............... | 380/30 |
| 5,655,148 A * | 8/1997 | Richman et al. | ............... | 710/8 |
| 6,308,227 B1 * | 10/2001 | Kumar et al. | ............... | 710/4 |
| 6,529,119 B1 * | 3/2003 | Kumar et al. | ............... | 340/10.2 |
| 6,671,749 B2 * | 12/2003 | Williams et al. | ............... | 710/10 |
| 6,687,774 B2 * | 2/2004 | Milios et al. | ............... | 710/72 |
| 6,694,428 B2 * | 2/2004 | Lemke et al. | ............... | 713/1 |
| 6,738,818 B1 * | 5/2004 | Shah | ............... | 709/228 |
| 7,162,554 B1 * | 1/2007 | Cole et al. | ............... | 710/104 |
| 7,275,118 B2 * | 9/2007 | Ytterstrom | ............... | 710/8 |
| 2001/0039611 A1 * | 11/2001 | Lin et al. | ............... | 713/1 |
| 2003/0065752 A1 * | 4/2003 | Kaushik et al. | ............... | 709/220 |
| 2004/0073912 A1 * | 4/2004 | Meza | ............... | 719/321 |
| 2004/0230710 A1 * | 11/2004 | Goodman | ............... | 710/8 |
| 2005/0071520 A1 * | 3/2005 | Hull et al. | ............... | 710/8 |
| 2007/0083679 A1 * | 4/2007 | Kikuchi | ............... | 710/8 |

FOREIGN PATENT DOCUMENTS

CN  1536776 A  * 10/2004
JP  2006048417 A  * 2/2006

* cited by examiner

*Primary Examiner*—Henry W. H. Tsai
*Assistant Examiner*—Steven G Snyder

(57) ABSTRACT

A system for installing an electronic device connected to a host device with consideration given to the host controller that enables the connection mechanism is provided. Information about the electronic device and the host controller is determined. An identifier that identifies the electronic device and the host controller is created based on the determined information. The identifier is used to search for a device driver for the electronic device that is specific to the host controller.

15 Claims, 5 Drawing Sheets

DEVICE INSTALLATION WITH HOST CONTROLLER CONSIDERATION

BACKGROUND

Many computing devices allow users to connect peripherals to the devices. These peripherals may include a variety of electronic devices, such as mice, keyboards, cameras, printers, headphones, portable storage units, or the like. The peripheral electronic devices may be connected to a host computing device via many different types of connections. Typically, the host computing device includes one or more controllers that provide the connection mechanisms. A driver is often needed to enable the host device to properly interact with a peripheral device. The manufacturer of the peripheral device generally provides the driver that is most suitable for installation.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system for installing an electronic device connected to a host device with consideration given to the host controller that enables the connection mechanism. Information about the electronic device and the host controller is determined. An identifier that identifies the electronic device and the host controller is created based on the determined information. The identifier is used to search for a device driver for the electronic device that is specific to the host controller.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanied drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for installing a device with host controller consideration, the system described is provided as an example and not a limitation. As those skilled in the art will appreciate, the present examples are suitable for application in a variety of different types of systems for managing devices connected a host with consideration given to the host controller that provides the connection mechanisms.

Figure 1:
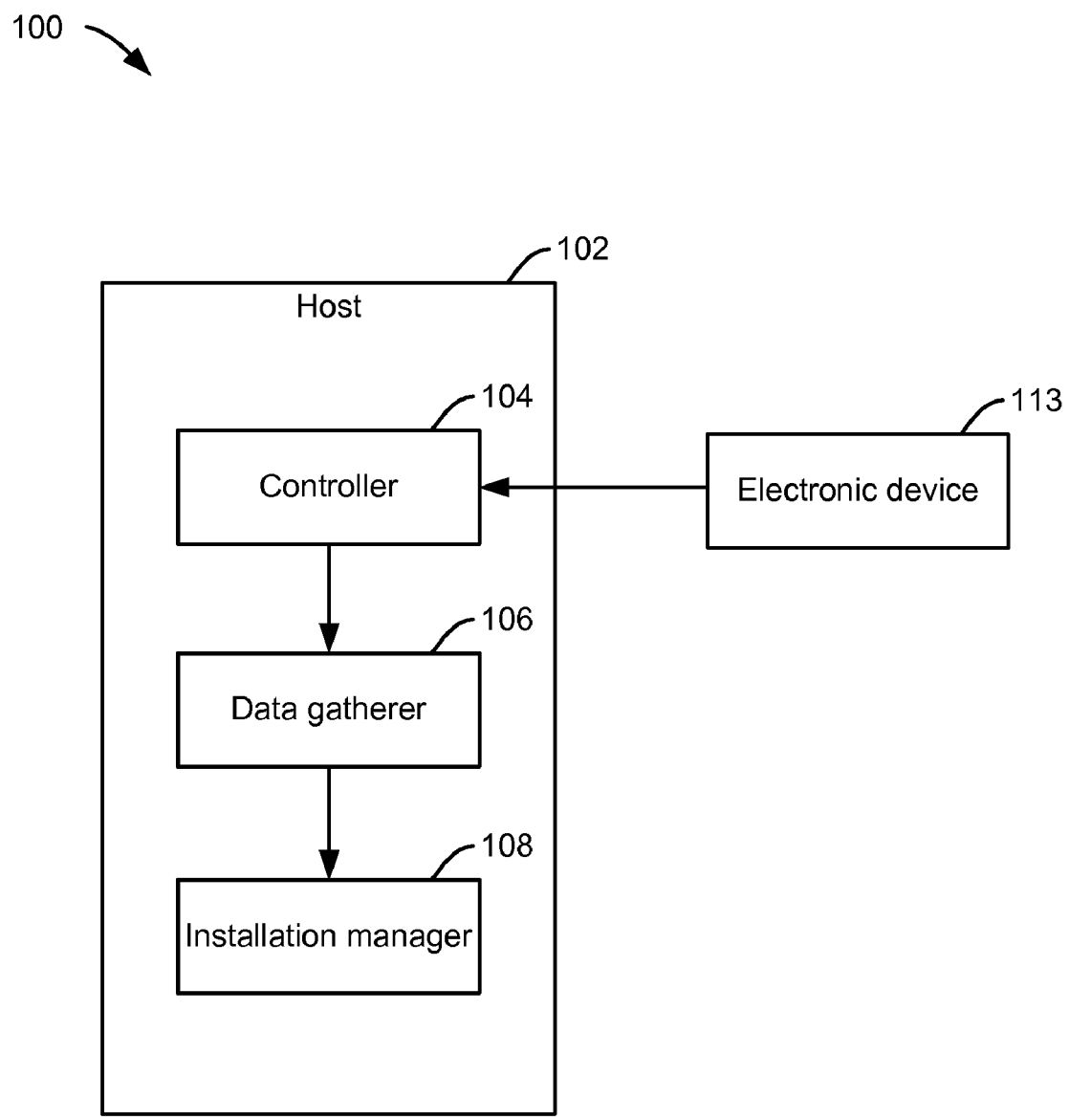
FIG. 1 shows an example system for installing an electronic device with host controller consideration.

FIG. 1 shows an example system 100 for installing an electronic device with host controller consideration. Host 102 is a computing device configured to provide connections with peripheral electronic devices. As shown in FIG. 1, host 102 includes controller 104, data gatherer 106 and installation manager 108. Controller 104 is configured to provide a connection on which electronic device 113 may be connected. Electronic device 113 may include a mouse, keyboard, camera, printer, headphone, portable storage unit, game controller, wired or wireless phone, memory card reader, security device or the like. For example, controller 104 may provide a Universal Serial Bus (USB) connection and enable electronic device 113 to connect to host 102 with a USB port. Controller 104 may also provide a connection in conjunction with other controllers in host 102. For example, controller 104 may be configured to provide a wireless connection, such as wireless fidelity (Wi-Fi), Bluetooth, infrared, wireless USB, or the like. Controller 104 may be connected to host 102 via a connection provided by another controller, such as a USB controller.

Data gatherer 106 is configured to receive information that identifies electronic device 113 and controller 104. The information may include any type of data associated with electronic device 113 and controller 104, such as device ID, class ID, capabilities, settings, or the like. Installation manger 108 is configured to identify electronic device 113 that connects to host 102 and configure host 102 to interact with electronic device 113. Installation manager 108 may be configured to determine a driver that enables electronic device to communicate with host 102 and to install the determined driver on host 102. The driver may be retrieved from a variety of sources, such as a data store in host 102, a location on a network, a computer-readable media, or the like.

In operation, electronic device 113 is connected to host 102 through a connection provided by controller 104. Data gatherer 106 detects electronic device 113 and receives information about the device. Data gatherer 106 also receives information about controller 104. Data gatherer 106 creates an identifier that identifies both electronic device 113 and controller 104. The identifier is provided to installation manager 108. Based in the identifier, installation manager 108 determines data specific to controller 104 for installing electronic device 113 and install the device using the data.

Figure 2:
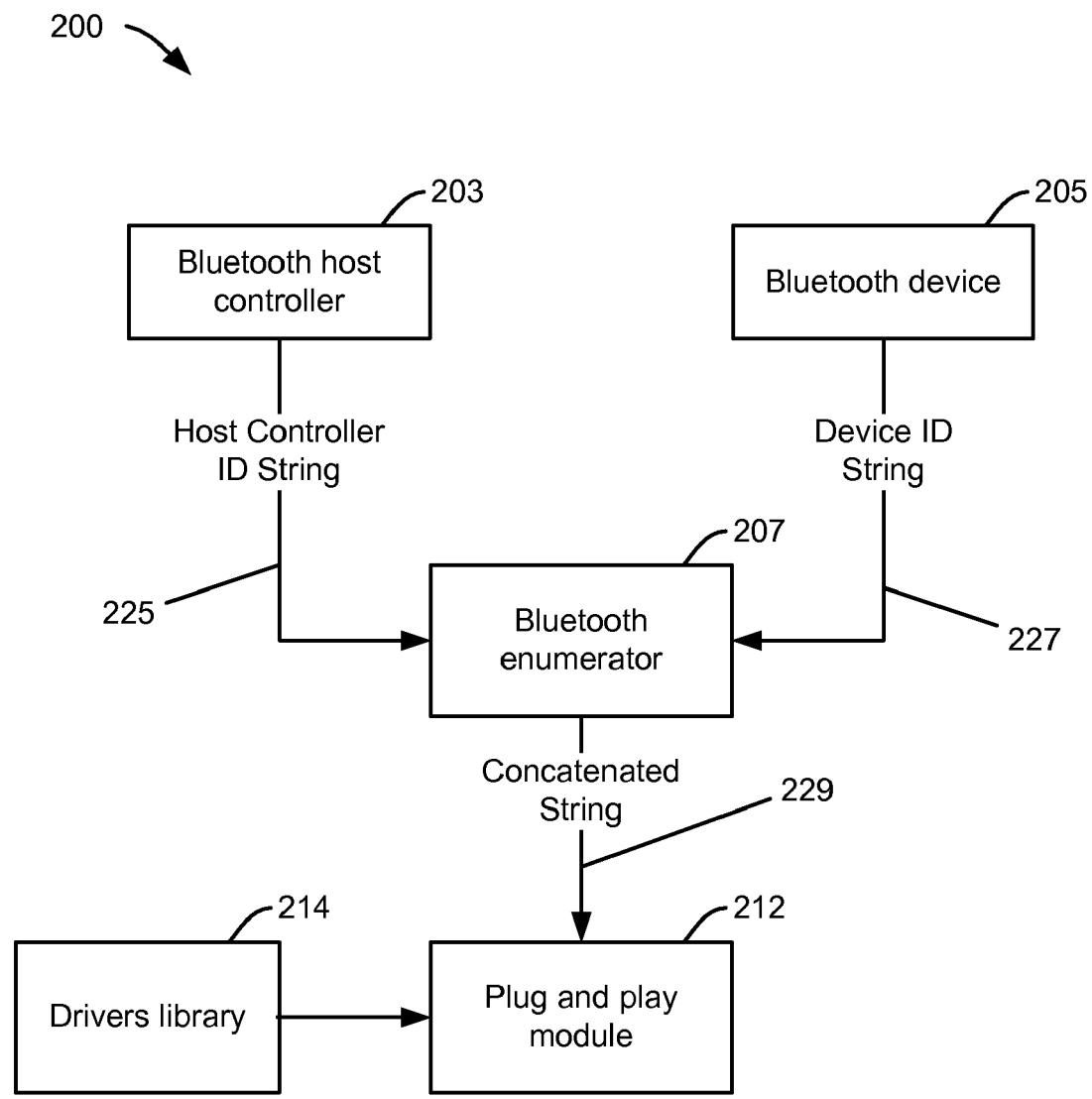
FIG. 2 shows an example system for installing a Bluetooth device 205 using a Bluetooth host controller specific device driver.

FIG. 2 shows an example system 200 for installing a Bluetooth device 205 using a Bluetooth host controller specific device driver. Bluetooth host controller 203 is configured to provide a Bluetooth connection on which Bluetooth device 205 may be connected. When Bluetooth device 205 establishes a connection with a host through Bluetooth host controller 203, Bluetooth enumerator 207 is configured to detect Bluetooth device 205 and retrieve a device ID string 227 that identifies the device. Bluetooth enumerator 207 is also configured to retrieve a host controller ID string 225 from Bluetooth host controller 203. Bluetooth enumerator 207 is then configured to concatenate the two strings to create a new string and send the new concatenated string to plug and play module 212. The concatenated string may include any identifier, such as a plug and play ID associated with Bluetooth device 205 and Bluetooth host controller 203.

Plug and play module 212 is configured to automatically load a driver for an electronic device to function with the host. Typically, a user may install devices, by plugging in the device or, in the case of Bluetooth, creating an association with the device. Specifically, plug and play module 212 receives concatenated string 229 and searches drivers library 214 for drivers associated with the string. Driver library 214 may be included in any data storage, such as the hard drive of a host device or an optical disc. Driver library 214 may also be included in a network location. Multiple drivers may be returned by the search performed by plug and play module 212. In this case, plug and play module 212 is configured to prioritize the drivers and select the driver with the highest priority. For example, plug and play module 212 may first select a driver provided by the manufacturer of Bluetooth host controller 203 if the driver is available. Plug and play module 212 may be configured to select a generic device driver usable by all host controllers only if a host controller specific device driver is not available.

Figure 3:
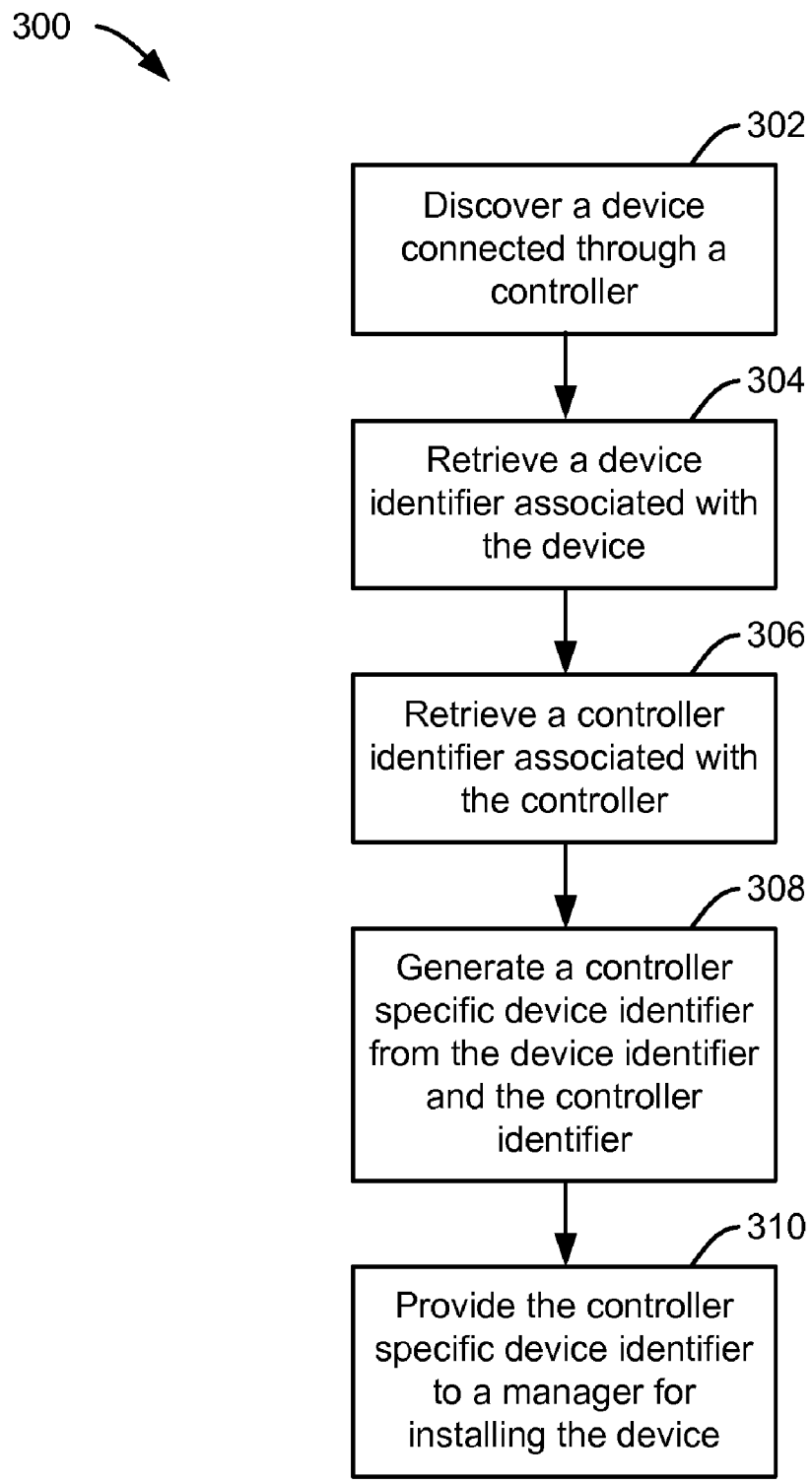
FIG. 3 shows an example process for processing data for installing a device connected via a particular host controller.

FIG. 3 shows an example process 300 for processing data for installing a device connected via a particular host controller. Process 300 may be implemented by the enumerator of a host to identify information for installing the device. At block 302, the device connected through the host controller is discovered. For example, a Bluetooth device may be connected via a Bluetooth host controller and is discovered by a Bluetooth enumerator. At block 304, a device identifier associated with the connected device is retrieved. The identifier may be a string that includes a device ID. At block 306, a controller identifier associated with the controller is retrieved. The controller identifier may include a string containing a host controller ID.

At block 308, a controller specific device identifier is generated from the device identifier and the controller identifier. For example, the controller specific device identifier may be a string concatenated from the string with the device ID and the string with the host controller ID. At block 310, the controller specific device identifier is provided to an installation manager for installing the device.

Figure 4:
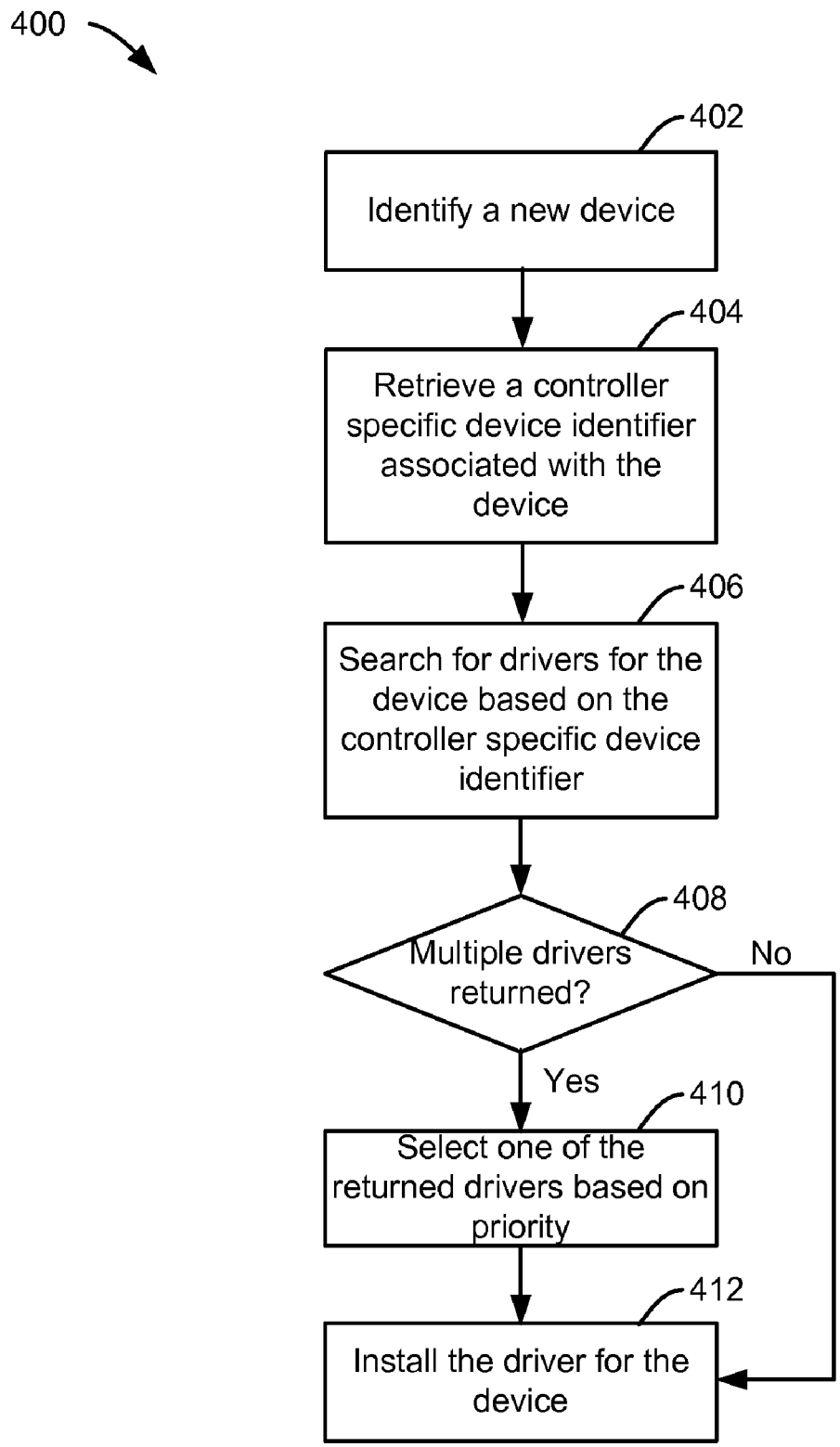
FIG. 4 shows an example process for installing a device with consideration given to the host controller associated with the device.

FIG. 4 shows an example process 400 for installing a device with consideration given to the host controller associated with the device. Process 400 may be implemented by an installation manager, such as a plug and play module, to install a newly connected device. At block 402, a new device is identified. For example, a Bluetooth device may be connected via a Bluetooth host controller and is identified by a Bluetooth enumerator. At block 404, a controller specific device identifier associated with the device is received. In one example implementation, the controller specific device identifier is a string that includes a device ID and a host ID provided by a Bluetooth enumerator. The controller-specific device identifier may also be a plug and play ID.

At block 406, drivers for the device are searched based on the controller specific device identifier. For example, an automatic configuration component, such as a plug and play module, may search for the appropriate driver in a driver library using the controller specific device identifier. The search may return all drivers that are associated with the type of the device, included drivers that are not specific to the particular device or the particular host controller. At decision block 408, a determination is made whether multiple drivers are returned from the search. If not, process 400 goes to block 412. If multiple drivers are returned, the process moves to block 410 where one of the returned drivers is selected based on a predetermined priority. For example, the plug and play module may be configured to select a driver based on a priority such that a driver that is specific to the device is selected first; a generic device type driver specific to the host controller is then selected; and a driver generic to the device type that can work with any host controller is selected last. At block 412, the select driver is installed for the device.

Figure 5:
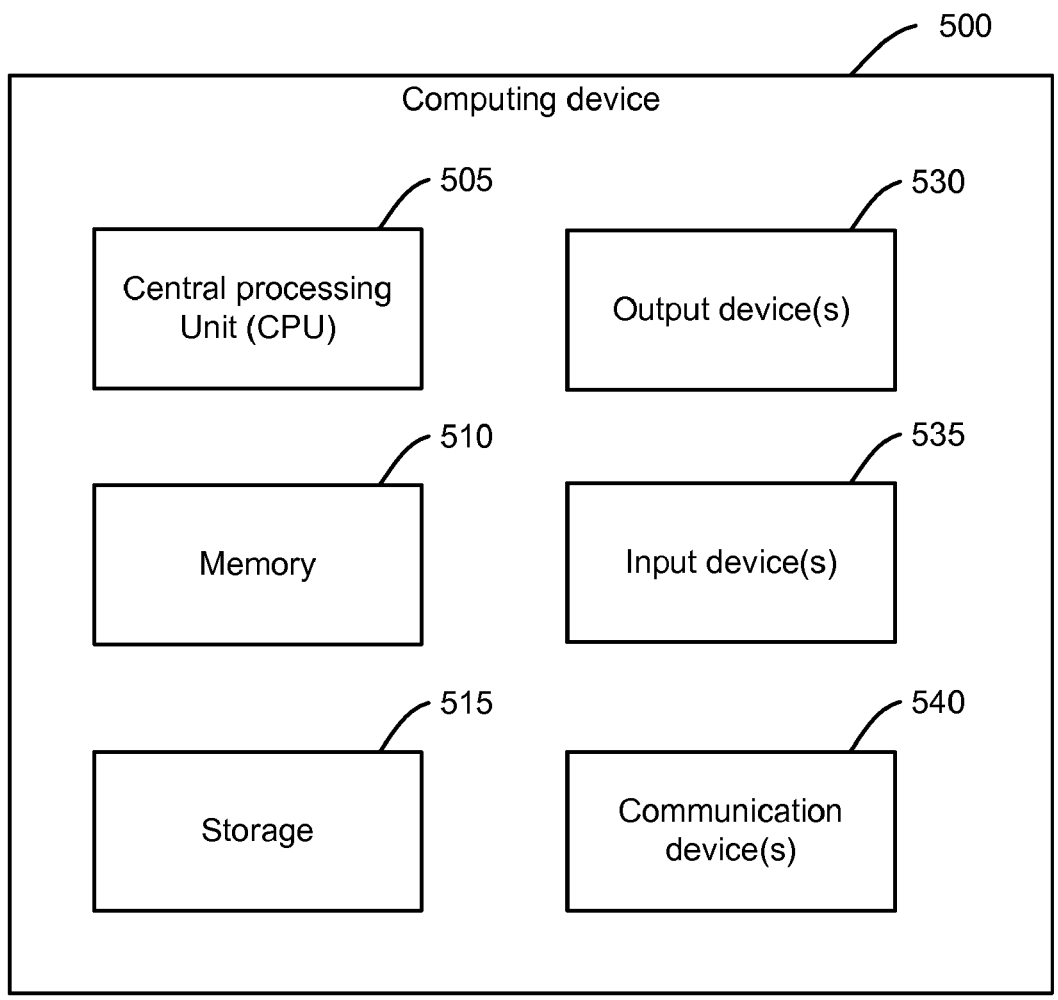
FIG. 5 shows an exemplary computer device for implementing the described systems and methods.

FIG. 5 shows an exemplary computer device 500 for implementing the described systems and methods. In its most basic configuration, computing device 500 typically includes at least one central processing unit (CPU) 505 and memory 510.

Depending on the exact configuration and type of computing device, memory 510 may be volatile (such as RAM), non-volatile (such as ROM, flash memory, etc.) or some combination of the two. Additionally, computing device 500 may also have additional features/functionality. For example, computing device 500 may include multiple CPU's. The described methods may be executed in any manner by any processing unit in computing device 500. For example, the described process may be executed by both multiple CPU's in parallel.

Computing device 500 may also include additional storage (removable and/or non-removable) including, but not limited to, magnetic or optical disks or tape. Such additional storage is illustrated in FIG. 5 by storage 515. Computer storage media includes volatile and nonvolatile, removable and non-removable media implemented in any method or technology for storage of information such as computer readable instructions, data structures, program modules or other data. Memory 510 and storage 515 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 500. Any such computer storage media may be part of computing device 500.

Computing device 500 may also contain communications device(s) 540 that allow the device to communicate with other devices. Communications device(s) 540 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 500 may also have input device(s) 535 such as keyboard, mouse, pen, voice input device, touch input device, etc. Output device(s) 530 such as a display, speakers, printer, etc. may also be included. All these devices are well know in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A computer apparatus comprising:
   a wireless host controller configured to provide wireless connections for arbitrary electronic peripheral devices to wirelessly connect to the computer apparatus;
   an enumerator executing on the computer apparatus and configured to detect an electronic peripheral device connecting via the wireless host controller and in response retrieve via the wireless host controller a device identifier string from the connected electronic peripheral device and a controller identifier string from the wireless host controller, wherein the wireless host controller provides the controller identifier string to the enumerator and the electronic peripheral device provides the device identifier string to the enumerator, the enumerator further configured to generate a controller specific plug-and-play device identifier string by including the peripheral device identifier string and the controller identifier string in the controller specific device identifier; and
   a plug-and-play module configured to receive the controller specific plug-and-play device identifier and to access a device driver library to search for a device driver for installing the electronic peripheral device, where the searching is based in part on the controller identifier string that identifies the wireless host controller such that the device driver for the peripheral device is selected from among other device drivers in the library based on the device driver having an association with the wireless host controller, where the device driver for the peripheral device handles communications between the electronic peripheral device and the computer apparatus via the wireless host controller, and where the plug-and-play module automatically installs device drivers for arbitrary peripheral devices when they connect with the computer apparatus.

2. The computer apparatus as recited in claim 1, wherein the enumerator is further configured to concatenate the controller identifier string and the peripheral device identifier string to generate the controller specific plug-and-play device identifier.

3. The computer apparatus as recited in claim 1, wherein the library is included in at least one of a data storage, hard drive, computer-readable media, optical disc, or network location.

4. The computer apparatus as recited in claim 1, wherein the plug-and-play module selects multiple drivers from the library based on some of the drivers being generic drivers for a device type of the electronic peripheral device and based on some of the drivers being drivers specifically for the electronic peripheral device, and selecting from among the multiple drivers the device driver for the peripheral device based on a pre-determined priority.

5. The computer apparatus as recited in claim 4, wherein the pre-determined priority includes giving the driver that is specific to the controller priority over a generic driver that functions with any controller.

6. The computer apparatus as recited in claim 1, wherein the electronic device includes at least one of a mouse, keyboard, camera, printer, headphone, portable storage unit, game controller, wire or wireless phone, memory card reader, or security device.

7. One or more device-readable storage media encoded with device-executable instructions for performing steps comprising:
   detecting, by an enumerator module executing on a host computer comprising a particular controller device, a peripheral device connecting to the host computer via the controller device, the particular controller device providing connectivity with the host computer for arbitrary peripheral devices;
   responsive to the detecting, identifying, by the enumerator module, the peripheral device coupled with the host computer via a connection provided by the particular controller device, the identifying including receiving a first identifier string that identifies the peripheral device, where the first identifier string is received by the enumerator module via the host controller device;
   responsive to detecting the peripheral device connecting via the particular controller device, obtaining a second identifier string that identifies the controller device, the obtaining performed by the enumerator module obtaining the second identifier string from the particular controller device;
   generating, by the enumerator module, a controller specific plug-and-play identifier string for the peripheral device, the controller specific plug-and-play identifier string including the first and second identifier strings such that the controller specific plug-and-play identifier string includes information identifying the particular controller device; and
   providing the controller specific plug-and-play device identifier string to a plug-and-play manager executing on the host computer and which installs device drivers for peripheral devices connecting with the host computer, the plug-and-play manager using the controller specific plug-and-play device identifier string to select a driver that is specifically configured to drive the peripheral device when it connects via the particular host controller, wherein other drivers associated with or compatible with the peripheral device are not selected as a result of availability of the selected driver.

8. The one or more device-readable storage media as recited in claim 7, further comprising concatenating the first identifier string and the second identifier string to generate the controller specific plug-and-play device identifier string.

9. The one or more device-readable storage media as recited in claim 7, wherein the host controller comprises either a Universal Serial Bus (USB), wireless fidelity (Wi-Fi), Bluetooth, wireless USB, or infrared controller.

10. One or more device-readable storage media encoded with device-executable instructions for performing steps comprising:
    detecting, by an enumerator module executing on a host computer comprising a particular controller device, a particular peripheral device connecting to the host computer via the controller device, the particular controller device providing connectivity with the host computer for arbitrary peripheral devices;

responsive to the detecting, identifying, by the enumerator module, the particular peripheral device connected with the host computer via a connection provided by the particular controller device, the identifying including receiving a single plug-and-play identifier that has first information that identifies the particular peripheral device and second information that identifies the particular controller device;

searching, by a plug-and-play manager, in a driver library by searching for a driver in the library that matches the information that identifies the particular peripheral device and that matches the information that identifies the particular controller device, where the searching finds multiple drivers that match first information and are compatible with the peripheral device, and then selecting the driver from among the found drivers based on the driver matching the second information that identifies the particular controller device; and installing the selected driver for the peripheral device on the host computer.

11. The one or more device-readable storage media as recited in claim 10, wherein the particular controller device comprises a Bluetooth host controller.

12. The one or more device-readable storage media as recited in claim 10, further comprising prioritizing the drivers and selecting the driver with the highest priority.

13. The one or more device-readable storage media as recited in claim 12, wherein a driver that is specific to the particular controller device has a higher priority than a generic driver for the peripheral device that is not specific to any controller.

14. The one or more device-readable storage media as recited in claim 10, wherein the identifier includes a first string provided by the peripheral device and a second string provided by the particular controller device.

15. The one or more device-readable storage media as recited in claim 14, wherein the identifier is a concatenation of the first string and the second string.

* * * * *